United States Patent [19]

Gerszberg et al.

[11] Patent Number: 5,448,251
[45] Date of Patent: Sep. 5, 1995

[54] AUTOMATIC TELESCOPIC ANTENNA MECHANISM

[75] Inventors: Irwin Gerszberg, Kendall Park; Norman P. Graule, Hackettstown; Eugene T. Kendig, Brick Township, Ocean County, all of N.J.

[73] Assignee: AT&T Corp., Murray Hill, N.J.

[21] Appl. No.: 125,578

[22] Filed: Sep. 23, 1993

[51] Int. Cl.⁶ ............................................... H01Q 1/24
[52] U.S. Cl. ...................................... 343/702; 343/903
[58] Field of Search ......................... 343/702, 900–903; 455/89, 90, 348, 351; H01Q 1/24; 379/433

[56] References Cited

U.S. PATENT DOCUMENTS

| | | | |
|---|---|---|---|
| 4,117,495 | 9/1978 | Hochstein | 343/877 |
| 4,847,629 | 7/1989 | Shimazaki | 343/713 |
| 4,920,352 | 4/1990 | Martensson et al. | 343/702 |
| 5,166,695 | 11/1992 | Chan et al. | 343/901 |

*Primary Examiner*—Michael C. Wimer

[57] ABSTRACT

A radiotelephone handset having a tubular telescoping antenna and a slide-open mouthpiece is provided with a mechanical coupling between the mouthpiece and the antenna for automatically extending the antenna when the mouthpiece is opened.

2 Claims, 1 Drawing Sheet

FIG. 1
FIG. 2
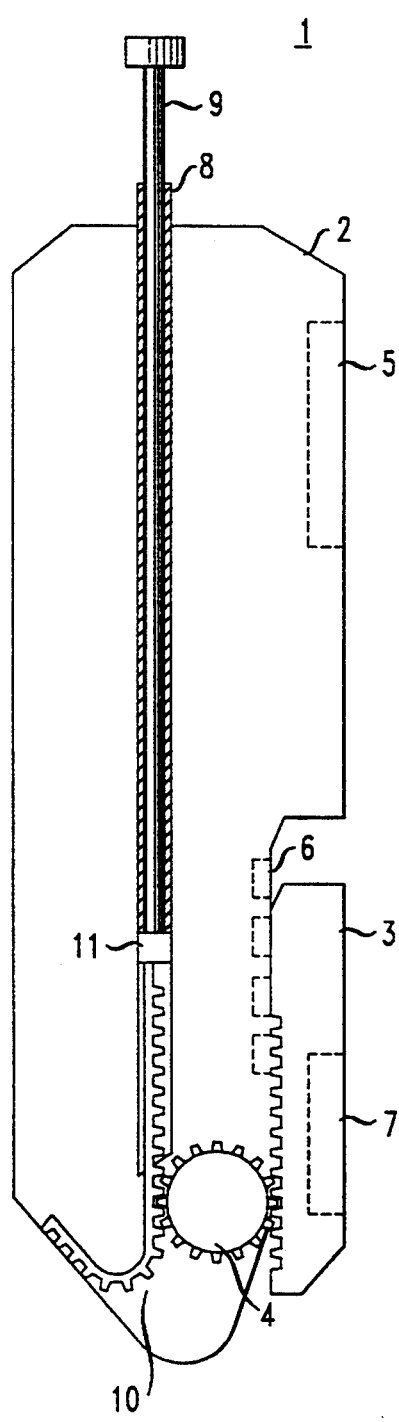
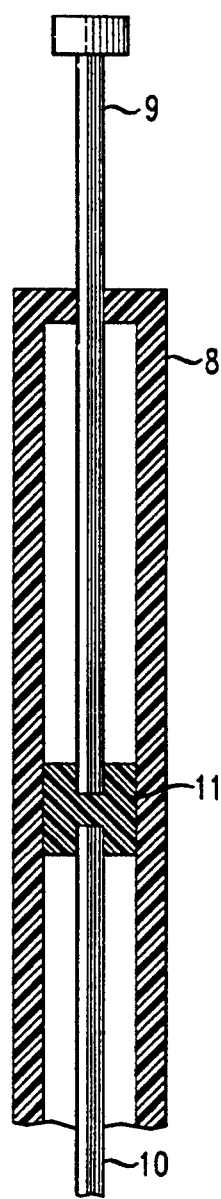

AUTOMATIC TELESCOPIC ANTENNA MECHANISM

RELATED APPLICATION

The present application is related to Application Serial No. 08/125,577 by the same inventors and assigned to the same assignee as the present application, and filed of even date herewith, to wit, Sep. 23, 1993.

BACKGROUND OF THE INVENTION

1. Field of the Invention

This invention relates to antennas, particularly to antennas for use on radiotelephone handsets, and most particularly to mechanisms for the automatic deployment and retraction of antennas for use on radiotelephone handsets.

2. Description of the Related Art

Radiotelephone handsets are becoming quite ubiquitous, particularly in the form of portable cellular telephones. Such a telephone typically has a retractable mouthpiece and a retractable antenna so that the telephone is as compact as possible when not in use, enabling it be carried conveniently.

To use such a telephone, a user must deploy the mouthpiece and deploy the antenna. If a user has his hands full or is preoccupied he may perform these operations in a slipshod manner, thus using the telephone with the antenna partially or completely retracted.

As is known in the prior art, such telephones are capable of operating at several different power levels, and of adjusting themselves to operate at the lowest feasible power level in order to conserve battery power. If the telephone is used with its antenna not fully deployed it may be forced to adjust itself to operate at a higher power level than necessary, thus increasing battery drain. Also, such operation may shorten the life of internal components by causing them to operate under strenuous conditions.

Such telephones are often subjected to rough handling. A user may neglect to retract the antenna when he finishes using the telephone; subsequent rough handling may damage or break the antenna.

SUMMARY OF THE INVENTION

It is a general object of the present invention to provide improved radiotelephones.

It is a particular object of the present invention to provide a radiotelephone having a retractable mouthpiece and a retractable antenna with a mechanism coupling the mouthpiece to the antenna for automatically deploying the antenna when the mouthpiece is deployed.

The present invention is to be used on a cellular telephone of the type where the microphone is on a mouthpiece which is slidably mounted on the body of the telephone; in order to use the telephone a user must slide the mouthpiece down the body, thus establishing an appropriate relative position between the speaker and the microphone and exposing a keypad located on the body of the telephone. The antenna is of the telescopic type, with a rod-type antenna plunger slidably installed in a hollow cylindrical antenna channel. Abutting the lower end of the antenna plunger is a length of flexible gear strip which emerges from the end of the antenna channel opposite to the end into which the antenna plunger retracts; a gear is engaged with the flexible gear strip; the slidable mouthpiece is equipped with teeth also engaging the gear; the sliding open of the mouthpiece thus rotates the gear so as to drive the flexible gear strip upward into the antenna channel, thus deploying the antenna plunger upward. Conversely, sliding the mouthpiece closed retracts the antenna plunger.

The novel features of construction and operation of the invention will be more clearly apparent during the course of the following description, reference being had to the accompanying drawing wherein there has been illustrated a preferred form of the device of the invention.

BRIEF DESCRIPTION OF THE DRAWINGS

FIG. 1 is a cutaway view of a telephone handset embodying the present invention.

FIG. 2 is a sectional view showing detail of the telescopic antenna of the present invention.

DESCRIPTION OF THE PREFERRED EMBODIMENTS

With reference to FIG. 1, a radiotelephone handset 1 comprises a body 2 with a mouthpiece 3 slidably mounted on the body. The body contains speaker 5 for use against a user's ear and a keypad 6. Keypad 6 is covered when mouthpiece 3 is closed. Mouthpiece 3 contains a microphone 7, positioned on the face of mouthpiece 3. A rod-type antenna plunger 9 is retractable into the upper end of tubular antenna channel 8 which is incorporated in body 2.

In order to use handset 1 a user must slide open mouthpiece 3, thus configuring handset 1 such that speaker 5 may be proximate to a user's ear and microphone 7 may be simultaneously proximate to her mouth. Also, the user must ensure that the antenna plunger is extended.

In handsets of the prior art the antenna plunger must be extended manually; it is possible to extend it only partially, or to attempt to use the handset without extending the antenna plunger at all. It is known in the prior art that the handset may operate at any of several power levels and that it adjusts its power level to the lowest level for current conditions; if the antenna plunger is only partially extended or not extended at all, the handset will probably operate at a higher power level than if the antenna plunger were fully extended, increasing power consumption and component stress.

Similarly, it is incumbent on the user of prior-art handsets to retract the antenna plunger upon completing use of the handset; it is possible to neglect retraction of the antenna plunger in which case the antenna plunger is exposed to the possibility of damage in the event of subsequent rough handling of the handset.

The handset of the present invention automatically extends antenna plunger 9 when mouthpiece 3 is opened, and automatically retracts antenna plunger 9 when mouthpiece 3 is closed.

Mouthpiece 3 has teeth comprising a rack (as in the term "rack and pinion") on the face adjacent to body 2; a slot in body 2 exposes teeth of pinion 4; the teeth of mouthpiece 3 engage the teeth of pinion 4, mouthpiece 3 and pinion 4 thus functioning as a rack and pinion.

Antenna plunger 9 is installed within antenna channel 8; fastened to its lower end by means of coupler 11 is flexible gear strip 10. Gear strip 10's teeth engage those of pinion 4.

It is seen from FIG. 1 that deploying mouthpiece 3 by sliding it downwards causes pinion 4 to rotate in the clockwise direction; this pushes gear strip 10 upwards. Gear strip 10 is sufficiently confined within antenna channel 8 that it is prevented from buckling laterally; it thus transmits upward force to coupler 11, thence to antenna plunger 9, deploying it upwards.

Conversely, sliding mouthpiece 3 upwards causes pinion 4 to rotate counter-clockwise, which pulls gear strip 10 downward, thus retracting antenna plunger 9. The lower end of gear strip 10 contacts the bottom of body 2 and is deflected back upward and is thus stored within body 2.

The handset of the preferred embodiment is for use at radio frequencies of 900 MHz. and 1.8 GHz.; antenna matching considerations dictate that the antenna plunger must be extended approximately two inches. Antenna plunger 9 is electrically continuous with antenna channel 8; the two together comprise the handset's antenna.

Further detail is given in FIG. 2, which depicts the upper portion of antenna channel 8 as being sectioned by a plane that includes antenna channel 8's axis. Antenna plunger 9 and gearstrip 10, both visible in FIG. 1, are shown unsectioned in FIG. 2. FIG. 2 also shows coupler 11 as being sectioned by the aforementioned plane. Coupler 11 is fastened to the lower end of antenna plunger 9 and the upper end of gearstrip 10. Coupler 11 is made of dielectric material; thus it couples antenna plunger 9 and gearstrip 10 together mechanically but keeps them electrically discontinuous. Gearstrip 10 is of dielectric material and thus does not electrically become a portion of the antenna even though it may have points of contact with antenna channel 8. Coupler 11 is of such diameter as to be freely slidable within antenna channel 8.

The lower end of antenna channel 8 is proximate to pinion 4. Antenna channel 8 is of such diameter that gearstrip 10 may freely enter it, but antenna channel 8 is not substantially larger than gearstrip 10's cross-section. Gearstrip 10, though flexible, is thus confined by antenna channel 8 from buckling laterally when transmitting force to push up antenna plunger 9.

One skilled in the art will appreciate that the invention may be embodied in other specific forms. The invention is intended to be embraced by the appended claims and not limited by the foregoing embodiment.

What is claimed is:

1. In a radiotelephone handset comprising
   a body;
   a telescopic antenna comprising
      a tubular antenna channel fastened to the body and having a first end and a second end; and
      an antenna plunger slidably installed within the first end of the antenna channel; and
   a mouthpiece including a microphone, the mouthpiece being slidably fastened to the body,
means responsive to a user's act of sliding the mouthpiece for extending the antenna plunger, comprising:
   a pinion rotatably mounted in the body;
   a first rack on a face of the mouthpiece adjacent to the body and engaged with the pinion; and
   a second rack engaged with the pinion and fastened to the antenna plunger.

2. The radiotelephone handset of claim 1, wherein further:
   the second rack is flexible,
   the second rack enters the second end of the antenna channel, and
   the second end of the antenna channel is proximate to the pinion,
whereby the second rack is confined by the antenna channel to prevent it from buckling.

* * * * *